United States Patent [19]

Stolz et al.

[11] 4,437,393
[45] Mar. 20, 1984

[54] ASSEMBLY COMPARTMENT ARRANGED BETWEEN AN ENGINE COMPARTMENT OR TRUNK AND A SPLASH PANEL OF A MOTOR VEHICLE

[75] Inventors: Albert Stolz, Tübingen; Manfred Mordau, Sindelfingen, both of Fed. Rep. of Germany

[73] Assignee: Daimler-Benz Aktiengesellschaft, Stuttgart, Fed. Rep. of Germany

[21] Appl. No.: 274,175

[22] Filed: Jun. 16, 1981

[30] Foreign Application Priority Data

Jun. 21, 1980 [DE] Fed. Rep. of Germany ....... 3023236

[51] Int. Cl.³ .............................................. B60H 1/28
[52] U.S. Cl. ....................................... 98/2.17; 98/2.07
[58] Field of Search ...................... 98/2.05, 2.06, 2.07, 98/2.08, 2.11, 2.16, 2.17, 2.19

[56] References Cited

U.S. PATENT DOCUMENTS

| 2,011,840 | 8/1935 | Arnold et al. | 98/2.17 |
| 2,304,643 | 12/1942 | Halis | 98/2.17 X |
| 2,510,790 | 6/1950 | Arnold | 98/2.17 X |
| 2,685,244 | 8/1954 | Wahlberg et al. | 98/2.17 X |
| 2,975,696 | 3/1961 | Jewell | 98/2.17 |
| 3,327,603 | 6/1967 | de Castelet | 98/2.07 |
| 3,387,549 | 6/1968 | de Castelet | 98/2.07 |

FOREIGN PATENT DOCUMENTS 2256298  6/1973  Fed. Rep. of Germany ....... 98/2.19

Primary Examiner—Albert J. Makay
Assistant Examiner—Harold Joyce
Attorney, Agent, or Firm—Craig & Burns

[57] ABSTRACT

An aggregate space or assembly compartment arranged between an engine compartment or a trunk and a splash panel of a motor vehicle. The aggregate space is closed off by means of a hood which can be swung upwardly and has an air inlet slot between an end edge of the aggregate space on a window side thereof and an adjoining zone of a body portion of the motor vehicle. The aggregate space accommodates an aggregate part of a heating/ventilating and/or air conditioning unit which in the interior of the aggregate space, takes over air deflecting and air distributing functions. The aggregate part includes a jacket for enhancing a water deposition or separation and a water drainage. Fresh air entering the aggregate space is conducted and deflected along the jacket and then passed to an air inlet opening set into an underside of the aggregate part. The air leaves the aggregate space through the inlet opening in an essentially upwardly oriented direction.

17 Claims, 1 Drawing Figure

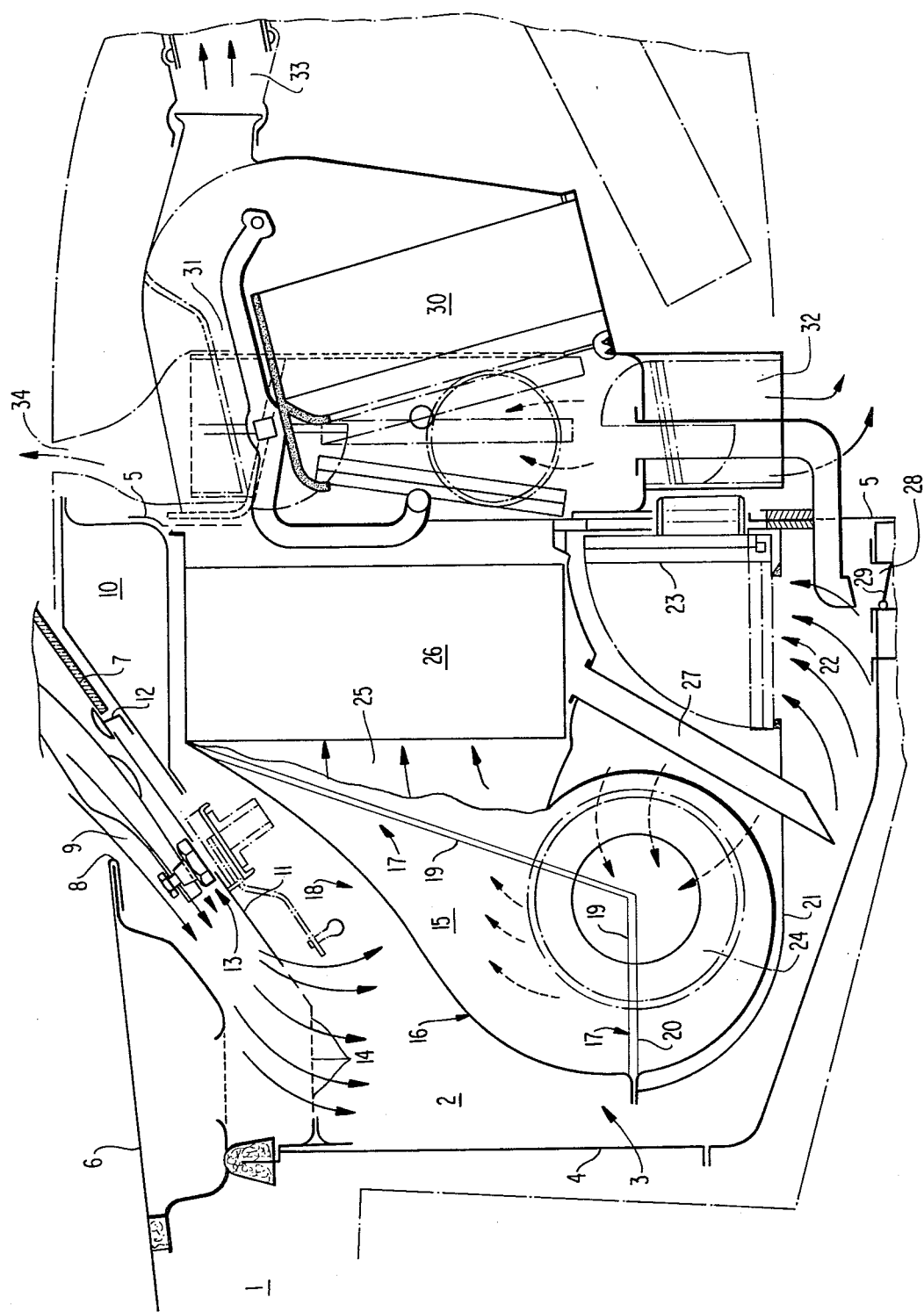

ASSEMBLY COMPARTMENT ARRANGED BETWEEN AN ENGINE COMPARTMENT OR TRUNK AND A SPLASH PANEL OF A MOTOR VEHICLE

The present invention relates to an aggregate space or assembly compartment and, more particularly, to an assembly compartment arranged betweenn an engine compartment or trunk space and a splash panel of a motor vehicle.

In, for example, Auslegeschrift No. 1, 106, 615, an aggregate space or assembly compartment is proposed which is adapted to be closed off by means of a hood mounted so as to be swung upwardly, with the space having an air inlet slot arranged between an end edge of the aggregate space on a window side and an adjoining zone of a body of the motor vehicle. The aggregate space is adapted to accommodate aggregate parts of a heating/ventilating and/or air conditioning unit which unit, in an interior of the aggregate space, takes over air deflecting and air distributing functions.

An advantage of the above-proposed space resides in the fact that the accommodated aggregates are readily accessible and are not exposed to engine heat nor subject to any appreciable soiling. However, disadvantages of this proposed construction reside in the problems encountered in preventing water draining from the windshield as well as raindrops in the inflowing air from entering into the aggregate part serving for the heating-/ventilating and/or air conditioning of the interior compartment of the vehicle.

The aim underlying the present invention essentially resides in providing an aggregate space or assembly compartment for motor vehicles which results in the elimination of water droplets, which could impair a functional capacity of an aggregate part serving for heating/ventialting and/or air conditioning from a supplied air stream without substantially reducing the installation space available and without impairing accessibility to the aggregate parts.

In accordance with advantageous features of the present invention, an aggregate space arranged between an engine compartment or trunk and a splash panel of a motor vehicle includes a jacket enhancing a water deposition an drainage along which entering fresh air is guided and deflected, whereafter the air passes to an air inlet opening provided as an inset on an underside of the aggregate part and exits from the aggregate space in an essentially upwardly oriented direction through the air inlet opening.

Preferably, in accordance with the present invention, wherein the water drainage is enhanced by the effect of gravity, the jacket portion of the aggregate part facing the air inlet slot extends in an ascending fashion approximately in a roof-like shape and is constructed as a baffle plate for the incoming air.

In order to obtain a structural component which occupies little installation space and is attachable to the splash panel as a preassembled unit, the jacket zone forms and end wall of a fan and of an adjacent pressure joint.

In accordance with still further features of the present invention, a detachable flange may be provided following a bottom edge of the windshield, with the flange extending up to the end wall of the engine side and receiving portions of a windshield wiper unit. The flange may be provided with a zone having perforations for holding back coarse dirt particles. By virtue of the provision of the flange construction, an oriented air stream is produced which exits in a controlled fashion in a direction of the jacket.

Advantageously, the air inlet opening is sealable by a flap forming a fresh air/bypass air gate switch. In this connection, the flap may be articulated to the splash panels so that the aggregate part can be lifted off without first having to release any control or adjusting means. In order to achieve a satisfactory water drainage at a centrally located point, a water drain hole is provided at the lowest point of the aggregate space.

In accordance with the present invention, with the water drain hole provided at the lowest point of the aggregate space, the intake of, for example, dusty or engine heated air is prevented if the water drain hole is equipped with a non-return flap type valve.

In accordance with the present invention, a space adjoining the pressure joint may be utilized for air dehumidification and the construction of the heating/ventilating and/or air conditioning unit on the inside may be made uniform if the aggregate part exhibits a fine mesh or fine screen type filter and/or evaporator of an air conditioning unit arranged in front of the splash plane and if the water arriving in this zone is conveyed to the aggregate space through a duct.

In order to enable a ready replacement of the fine mesh or fine screen filter and an inspection of the evaporator if necessary, the jacket is provided with a division so that, after removing the thus formed lid an installation opening is produced.

In order to avoid the running off of water deposited on the jacket the division of the jacket is provided with flanges, with a marginal zone thereof being fashioned as a drip edge.

Accordingly, it is an object of the present invention to provide an aggregate space or assembly compartment arranged between an engine compartment or a trunk and a splash panel of a motor vehicle which avoids, by simple means, shortcomings and disadvantages encountered in the prior art.

Another object of the present invention resides in providing an aggregate space or assembly compartment arranged between an engine compartment or a trunk and a splash panel of a motor vehicle which eliminates the presence of water droplets in supplied air with a minor expenditure in structural parts.

Yet another object of the present invention resides in providing an aggregate space or assembly compartment arranged between an engine compartment or trunk and splash panel of a motor vehicle which is simple in construction and therefore relatively inexpensive to manufacture.

A further object of the present invention resides in providing an aggregate space or assembly compartment arranged between an engine compartment or trunk and a splash panel of a motor vehicle which does not substantially reduce the installation space available for aggregate parts nor impair the accessibility to such parts.

These and other objects, features, and advantages of the present invention will become more apparent from the following description when taken in connection with the accompanying drawing which shows, for the purposes of illustration only, one embodiment in accordance with the present invention, and wherein:

The single FIGURE of the drawing is a partially schematic cross sectional view of an aggregate space or assembly compartment arranged between an engine compartment or trunk and splash panel of a motor vehicle constructed in accordance with the present invention.

Referring now to the single FIGURE of the drawing, according to this FIGURE, an engine compartment or trunk 1 of a motor vehicle (not shown) has an aggregate space 2 arranged adjacent thereto. The aggregate space 2 includes, in addition to electrical equipment (not shown) such as, for example, control devices and an encapsulted battery, also an aggregate part generally designated by the reference numeral 3 which may, for example, form a component of a heating/ventilating and/or air conditioning installation.

The aggregate space 2 is defined by a divided end wall 4 on a side thereof facing the engine compartment or trunk 1 followed by a splash panel 5 and laterally by parts of a wheel arch of a fender (not shown). A hood 6 is provided for shielding the aggregate space 2 from the engine compartment, with the hood 6 including an end edge 8 terminating at a spacing from the windshield 7 so that an air inlet slot 9 is created between the end edge 8 and the windshield 7. An upper cross rail 10, connected with the splash panel 5, has a detachable flange 11 arranged forwardly thereof, with the flange 11 extending approximately from a bottom edge 12 of the windshield 7 to the end wall 4 and accommodating in the space defined thereby a schematically illustrated windshield wiper unit 13. Perforations 14 are provided in the flange 11, with the perforations 14 constituting a coarse filter for holding back dirt such as leaves or the like and effecting a controlled flow in a direction of the subsequently located aggregate part 3.

The aggregate part 3 includes a jacket 15 constructed and arranged so as to enhance or favor a water deposition and water drainage with a zone 16 of the jacket 15 facing the air inlet slot ascending in the manner of a roof and acting as a baffle plate with respect to the incoming air. The jacket 15 is provided with a division or separation generally designated by the reference numeral 17 so as to result in the formation of a lid generally designated by the reference numeral 18 which closes a mounting opening. The division 17 terminates in flanges 19 so that any accumulating water which may be entrained in the incoming air drips off an edge zone 20 of the flanges 19 and is thereby prevented from passing to an underside 21 of the aggregate part 3. Consequently, air which is most extensively free of water droplets enters into an air inlet opening 22 disposed on an underside 21 of the jacket 15. The air inlet opening 22 is adapted to be selectively sealed by a flap 23 constructed as, for example, a fresh air/bypass air gate switch.

The zone 16 of the jacket 15 forms an end wall for a fan 24 and for a pressure joint 25 adjoining the fan 24 from which the drawn in air is urged through a fine mesh filter 26. The filter 26 may, for example, be replaced by an evaporator (not shown) of an air conditioning unit (not shown). Moisture precipitated in the fine mesh filter 26 passes through a duct 27 to the aggregate space 2. A water drain hole 28 is provided in the aggregate space 2 at the lowest point thereof, with the drain hole being adapted to be closed off by a non-return flap valve 29 for preventing an intake of infiltrating air from, for example, the engine compartment 1.

The fan 24 and the fine mesh filter 26 are disposed forwardly of the splash pan 5; whereas, the elements serving for air conductance and distribution are arranged behind the splash panel 5 and are installed from an interior of the vehicle. A heat exchanger 30 is provided and is adapted to be covered to a greater or lesser extent so as to vary the heating capacity thereof. A bypass 31 is provided so as to ensure the existence of sufficient flow of air even when the heat exchanger 30 is fully covered. The bypass 31 passes to the outlets 32, 33 and 34 so as to affect various zones of the passenger space or passenger compartment of the motor vehicle.

While we have shown and described only one embodiment in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. An assembly compartment for a heating/ventilating and/or air conditioning system arranged between an engine compartment or trunk and a splash panel of a motor vehicle comprising an air inlet slot means for enabling a supply of fresh air into the compartment; aggregate means accommodated in the compartment for affecting air deflecting and air distributing of the supply of fresh air into an interior space of the vehicle; jacket means accommodating at least a portion of the aggregate means are provided for enhancing separation, deflection, and conducting of water extracted from the fresh air; means are arranged on an underside of the aggregate means for directing a flow of the supply of fresh air from the assembly compartment to the interior space of the vehicle in an upwardly oriented direction; an area forward of the splash panel for at least one of a filter means and an evaporator for an air conditioning means; duct means in said area for feeding water accumulated therein to a lower end of the assembly compartment; water drainage means at a lowest point of the assembly compartment for enabling a drainage of water separated and drained by the jacket means and duct means; the jacket means having a divided construction and including a lid means removable so as to define an installation opening for the jacket means to permit access to said filter means and/or said evaporator for an air conditioning means whereby water is extracted from the supply of fresh air and access to said area of the jacket means from the exterior of the motor vehicle is facilitated.

2. An assembly compartment according to claim 1, wherein a hood means pivotally mounted at the compartment is provided for closing off the compartment, the air inlet slot means is defined between an edge of the hood means and a portion of a body of the vehicle, and the aggregate means forms a part of at least one of a heating-ventilating means and air conditioning means for the vehicle.

3. An assembly compartment according to claim 2, wherein the portion of the vehicle is a window assembly.

4. An assembly compartment according to claims 1 or 2, wherein a portion of the jacket means facing the air inlet slot means extends in an approximately ascending fashion and serves as a baffle means for the supply of fresh air.

5. An assembly compartment according to claim 4, wherein the portion of the jacket means forms an end wall for a fan means of the aggregate means and a pressure zone is arranged adjoining the fan means.

6. An assembly compartment according to claim 5, wherein the vehicle includes a window assembly having a bottom edge, a detachably mounted flange means is arranged at the bottom edge of the window assembly, the flange means extends up to an end wall separating the assembly compartment from the engine compartment or trunk and forms a space for accommodating at least a portion of a vehicle wiper unit and means are provided in the flange for retaining coarse dirt particles.

7. An assembly compartment according to claim 6, wherein the retaining means are formed as a plurality of perforations.

8. An assembly compartment according to claim 6, wherein the means for directing a flow of air from the assembly compartment to the interior space of the vehicle is formed as an air inlet opening means, and in that means are provided for selectively sealing the air inlet opening means.

9. An assembly compartment according to claim 8, wherein the sealing means is constructed as a fresh air/bypass air gate switch.

10. An assembly compartment according to claim 1, wherein means are provided at the drainage means for controlling an opening and closing thereof.

11. An assembly compartment according to claim 10, wherein the controlling means is a one way flap valve.

12. An assembly compartment according to claim 1, wherein flange means are provided along a dividing area of the jacket means, and an edge zone of the flange means are formed as a water drip edge.

13. An assembly compartment according to claims 1 or 2, wherein the vehicle includes a window assembly having a bottom edge, a detachably mounted flange means is arranged at the bottom edge of the window assembly, the flange means extends up to an end wall separating the assembly compartment from the engine compartment or trunk and forms a space for accommodating at least a portion of a vehicle wiper unit, and means are provided in the flange for retaining coarse dirt particles.

14. An assembly compartment according to claims 1 or 2, wherein the means for directing a flow of air from the assembly compartment to the interior space of the vehicle is an air inlet opening means, and means are provided for selectively sealing the air inlet opening means.

15. An assembly compartment according to claim 14, wherein the sealing means is constructed as a fresh air/bypass air gate switch.

16. An assembly compartment according to claims 1 or 2, wherein means are provided at a lowermost point of the assembly compartment for enabling a drainage of water separated and drained by the jacket means.

17. An assembly compartment according to claim 1, wherein the flange means are provided along a dividing are of the jacket means and an edge zone of the flange means are formed as a water drip edge.

* * * * *